Oct. 25, 1960   C. R. HOWLETT   2,957,375
CHIP GUARD FOR DRILL PRESS AND ROUTER
Filed March 23, 1959
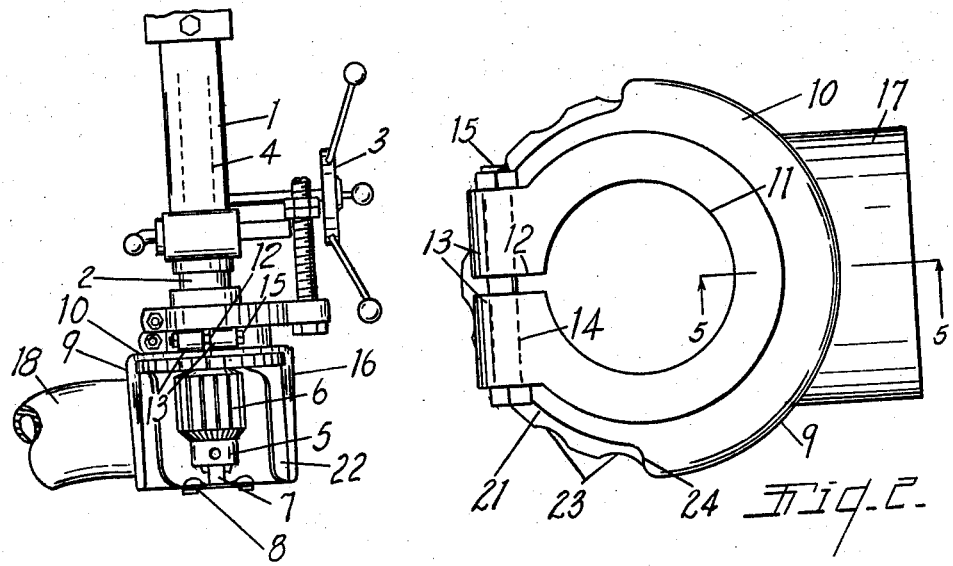
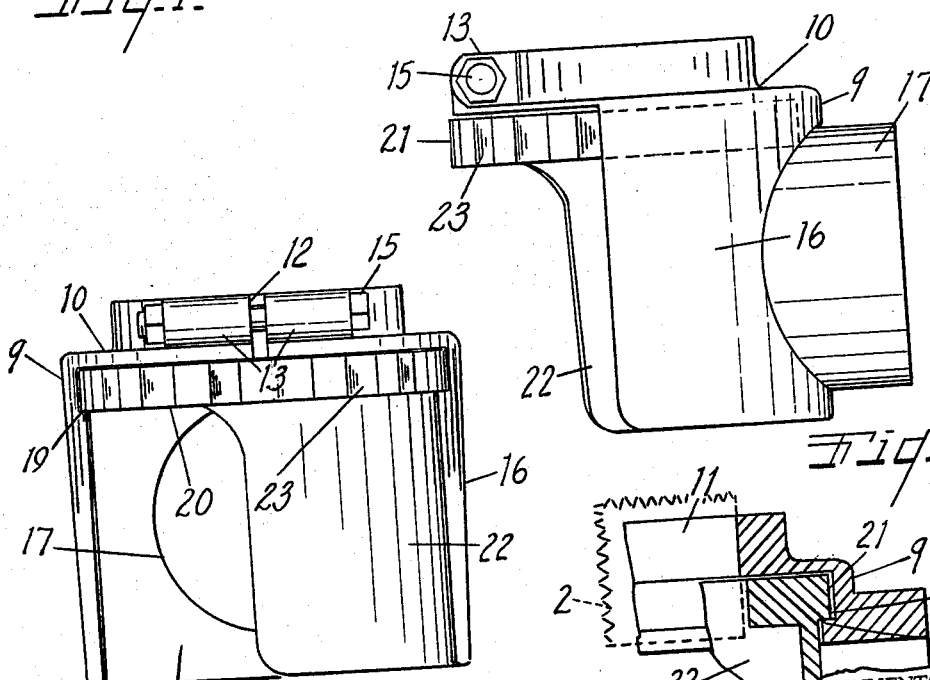
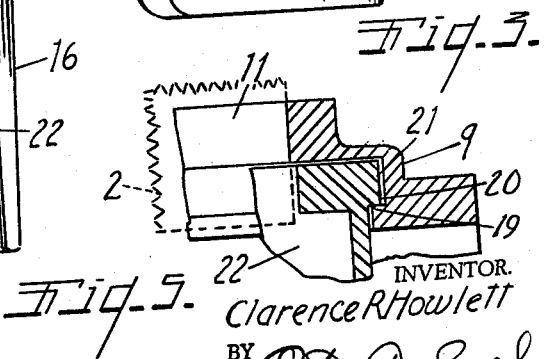
INVENTOR.
Clarence R Howlett
BY 
ATTORNEY.

United States Patent Office 2,957,375
Patented Oct. 25, 1960

2,957,375
CHIP GUARD FOR DRILL PRESS AND ROUTER

Clarence R. Howlett, Niles, Mich., assignor to Arlene R. Howlett, Niles, Mich.

Filed Mar. 23, 1959, Ser. No. 801,012

3 Claims. (Cl. 77—55)

This invention relates to improvements in chip guard for router tools. The principal objects of this invention are:

First, to provide a chip guard attachable to the quill of a router tool machine which opens to expose the tool chuck of the machine and at the same time closes off a suction passage in the guard, the suction passage being open when the guard is closed to draw off chips and dust created by the tool.

Second, to provide a chip guard that can be economically formed of sturdy castings and which is easily attached to a machine tool.

Third, to provide a chip guard with a door or gate that rotates around the axis of the tool and rides on a semi-circular track that is formed on the body of the guard as part of the casting operation when the body is formed.

Other objects and advantages of the invention will be apparent from a consideration of the following description and claims. The drawings, of which there is one sheet, illustrate a highly practical form of the invention.

Fig. 1 is a fragmentary front elevational view of a drill press machine with the chip guard of the invention applied thereto and with the door or gate of the guard open.

Fig. 2 is an enlarged top plan view of the guard with the door or gate open.

Fig. 3 is a side elevational view of the guard in open position.

Fig. 4 is a front elevational view partially broken away, of the guard with the gate partly closed.

Fig. 5 is a fragmentary cross sectional view taken along the plane of the line 5—5 in Fig. 2.

Fig. 1 illustrates conventionally a drill press having a fixed arm or frame member 1 that projects horizontally over a work support or table (not illustrated). The arm carries a vertically extending and reciprocable quill 2 that is moved up and down as by a hand wheel 3 in a well known manner to advance the tool to the work. The quill carries a driven spindle 4 that rotates within the quill. The spindle carries a chuck 5 having a relatively rotatable clamp ring 6 for adjusting the jaws of the chuck to grip and release the shank 7 of a tool bit or router tool 8. The details of the drill press and its quill, spindle and chuck are not described further as they are well known in the art and can vary with different machines.

The guard of the invention is applied to the drill press and consists first of a body 9 having a flat upper plate 10 defining a central hole 11 larger than the quill to which it is to be applied. The plate is split radially as at 12 and provided with parallel flats 13 on opposite sides of the split. Holes 14 formed through the flats receive a clamp bolt 15 that clamps the plate to the quill.

Below the plate 10, the body has in integral depending semi-cylindrical skirt 16 located along its rear portion. The center portion of the skirt 16 is formed rearwardly in a suction tube or collar 17 that opens through the skirt and is adapted to be connected to a vacuum tube 18 (see Fig. 1) for drawing off chips and dust created by operation of the tool.

Around the upper edge of the skirt there is formed a semi-circular track or shoulder 19 facing upwardly. The semi-cylindrical shape of the skirt permits the shoulder to be formed by a rib on the internal mold that forms the inside of the skirt. The track supports the external shoulder 20 of a circular gate ring 21. The ring 21 has an integral depending semi-cylindrical door or gate 22 of slightly smaller diameter than the skirt 16. After the ring and gate are inserted into the body and over the track 19 the gate is retained in the body 9 by positioning the lower end of the quill 2 inside of the ring 21 as shown in Fig. 5.

The outer periphery of the ring 21 is notched as at 23 and projects outwardly from the front of the plate 10 to facilitate manual rotation of the gate between the fully open and closed positions of the gate.

When the gate is open, the chuck 5 is exposed for easy operation of the clamp ring or for inspection of the tool and the work. At the same time the opening to the suction tube 17 is closed off so that suction and drafts through the guard do not annoy the operator. The guard moves up and down with the quill and the tool and when the tool bit is adjusted and advanced to the desired position relative to the work, the gate is easily closed by simply turning the notched ring 21 in a half circle. The suction tube 17 is of course opened to draw off chips as the work progresses. The top plate 10 is cut back or reduced in radius along the front of the guard as at 24 to expose the notches 23 in the ring 21.

What is claimed as new is:

1. A chip guard for tools having a reciprocable quill surrounding a spindle having a chuck comprising a body having a top plate defining a quill receiving hole, said plate being split and provided with a clamp bolt for clamping the plate to the quill, a semi-cylindrical skirt depending from the back of said plate and having a suction tube opening therethrough, an upwardly facing semi-circular track formed around the inside of said skirt adjacent the upper end thereof, a circular gate ring having a downwardly facing exterior shoulder supported on said track and having a central opening sized to surround said quill, and a semi-cylindrical gate depending from said ring and rotatable therewith within said skirt, said gate ring having finger grip notches formed in its periphery and exposed at the front of said top plate, said top plate being reduced in radial dimension at the front thereof.

2. A chip guard for tools having a reciprocable quill surrounding a spindle having a chuck comprising a body having a circular top plate defining a quill receiving hole, said plate being split and provided with a clamp bolt for clamping the plate to the quill, a semi-cylindrical skirt depending from said plate and having a suction tube opening therethrough, an upwardly facing semi-circular track formed on said skirt around the inside of said skirt adjacent the upper end thereof, a circular gate ring having a downwardly facing exterior shoulder supported on said track and having a central opening adapted to receive said quill, and a semi-cylindrical gate depending from said ring and rotatable therewith within said skirt, said gate ring having grip notches formed in its periphery and exposed at the front of said top plate.

3. A chip guard for tools having a reciprocable quill surrounding a spindle having a chuck comprising a body having a top plate defining a quill receiving hole, said plate being split and provided with means for clamping the plate to the quill, a semi-cylindrical skirt depending from said plate and having a suction tube opening therethrough, an upwardly facing semi-circular track around the inside of said skirt adjacent the upper end thereof, a circular gate ring having a downwardly facing exterior shoulder supported on said track and having a central opening adapted to retainingly receive said quill, and a semi-cylindrical gate depending from said ring and rotatable therewith within said skirt and depending below the level of said suction tube opening.

References Cited in the file of this patent

FOREIGN PATENTS

| | | |
|---|---|---|
| 18,732 | Great Britain | 1908 |
| 574,285 | Great Britain | Dec. 31, 1945 |
| 131,293 | Sweden | Apr. 10, 1951 |